United States Patent
Yi et al.

(10) Patent No.: US 9,628,586 B2
(45) Date of Patent: Apr. 18, 2017

(54) PDCP OPERATION IN A WIRELESS COMMUNICATION SYSTEM SUPPORTING DUAL CONNECTIVITY

(71) Applicant: LG ELECTRONICS INC., Seoul (KR)

(72) Inventors: Seungjune Yi, Seoul (KR); Sunyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 238 days.

(21) Appl. No.: 14/473,316

(22) Filed: Aug. 29, 2014

(65) Prior Publication Data

US 2016/0065700 A1    Mar. 3, 2016

(51) Int. Cl.
| | |
|---|---|
| H04L 29/06 | (2006.01) |
| H04W 12/00 | (2009.01) |
| H04W 80/00 | (2009.01) |

(52) U.S. Cl.
CPC .......... *H04L 69/04* (2013.01); *H04W 12/00* (2013.01); *H04W 80/00* (2013.01)

(58) Field of Classification Search
None
See application file for complete search history.

(56) References Cited

U.S. PATENT DOCUMENTS

2005/0270996 A1*  12/2005  Yi ..................... H04L 1/1841
                                                  370/312
2016/0164793 A1*   6/2016  Basu Mallick ....... H04W 28/06
                                                  370/235

OTHER PUBLICATIONS

LG Electronics Inc., "PDCP Reordering for Architectures 3C", 3GPP TSG-RAN WG2 Meeting #84, R2-134027, Nov. 11-Nov. 15, 2013, pp. 1-3.

* cited by examiner

*Primary Examiner* — Sulaiman Nooristany
(74) *Attorney, Agent, or Firm* — Birch, Stewart, Kolasch & Birch, LLP (57) ABSTRACT

PDCP operations in a wireless communication system supporting dual connectivity are disclosed. According to this scheme, when the PDCP of the UE receives PDCP PDU from two RLCs, the PDCP reordering is performed first on the received PDCP PDU. Then, deciphering and decompressing are performed after the PDCP reordering.

8 Claims, 11 Drawing Sheets

(a) Control-Plane Protocol Stack (b) User-Plane Protocol Stack

(a) C-Plane connectivity of eNBs involved in dual connectivity

FIG. 6B (b) U-Plane connectivity of eNBs involved in dual connectivity

PDCP OPERATION IN A WIRELESS COMMUNICATION SYSTEM SUPPORTING DUAL CONNECTIVITY

BACKGROUND OF THE INVENTION

Field of the Invention

The present invention relates to communicating data in a wireless communication system, and more particularly, to methods for PDCP operation in a wireless communication system supporting dual connectivity.

Discussion of the Related Art

As an example of a wireless communication system to which the present invention is applicable, a 3rd generation partnership project (3GPP) long term evolution (LTE) communication system will be schematically described.

Figure 1:
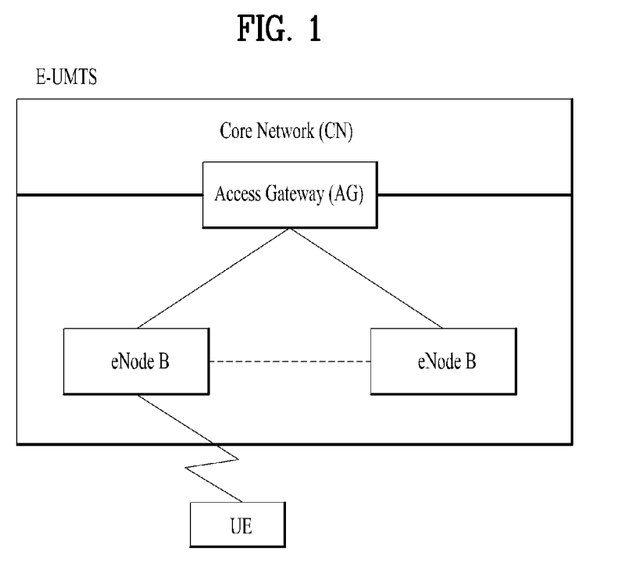
FIG. 1 is a diagram showing a network structure of an Evolved Universal Mobile Telecommunications System (E-UMTS) as an example of a wireless communication system.

FIG. 1 is a schematic diagram showing a network structure of an evolved universal mobile telecommunications system (E-UMTS) as an example of a wireless communication system. The E-UMTS is an evolved form of the legacy UMTS and has been standardized in the 3GPP. In general, the E-UMTS is also called an LTE system. For details of the technical specification of the UMTS and the E-UMTS, refer to Release 7 and Release 8 of "3rd Generation Partnership Project; Technical Specification Group Radio Access Network".

Referring to FIG. 1, the E-UMTS includes a user equipment (UE), an evolved node B (eNode B or eNB), and an access gateway (AG) which is located at an end of an evolved UMTS terrestrial radio access network (E-UTRAN) and connected to an external network. The eNB may simultaneously transmit multiple data streams for a broadcast service, a multicast service and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

SUMMARY OF THE INVENTION

Accordingly, the present invention is directed to communicating data in a wireless communication system supporting dual connectivity that substantially obviates one or more problems due to limitations and disadvantages of the related art.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of receiving data at a user equipment (UE) in a wireless communication system is proposed. This method comprises: receiving at least one Packet Data Convergence Protocol (PDCP) Protocol Data Unit (PDU) from two Radio Link Control (RLC) entities of the UE; reordering the PDCP PDU received from the two RLC entities; deciphering the reordered PDCP PDU; and decompressing a header of the deciphered PDCP PDU.

Here, the UE may simultaneously receive data from a first base station and a second base station, and one of the two RLC entities may be responsible for receiving data from the first base station, and the other of the two RLC entities may be responsible for receiving data from the second base station.

The method may further comprises one or more of: storing the PDCP PDU received from the two RLC entities in a reordering buffer; and removing a PDCP header of the reordered PDCP PDU.

The above reordering the PDCP PDU received from the two RLC entities may be for reordering the PDCP PDU in sequence without duplication to be delivered to an upper layer of a PDCP entity.

The above reordering may be performed by using a state variable specifically defined for said reordering.

The above reordering may be performed by using a timer specifically defined for said reordering.

In another aspect of the present invention, a user equipment (UE) receiving data in a wireless communication system is provided. This UE comprises: a transceiver configured to receive signals from a first base station and a second base station; a processor connected to the transceiver and comprising: a Packet Data Convergence Protocol (PDCP) entity; and two Radio Link Control (RLC) entities; wherein the processor is configured to control the PDCP entity to reorder at least one PDCP Protocol Data Unit (PDU) received from the two RLC entities, when the PDCP entity receives the PDCP PDU from the two RLC entities, to perform deciphering the reordered PDCP PDU, and to perform decompressing a header of the deciphered PDCP PDU.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF THE INVENTION

The configuration, operation and other features of the present invention will be understood by the embodiments of the present invention described with reference to the accompanying drawings. The following embodiments are examples of applying the technical features of the present invention to a 3rd generation partnership project (3GPP) system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the some embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 2:
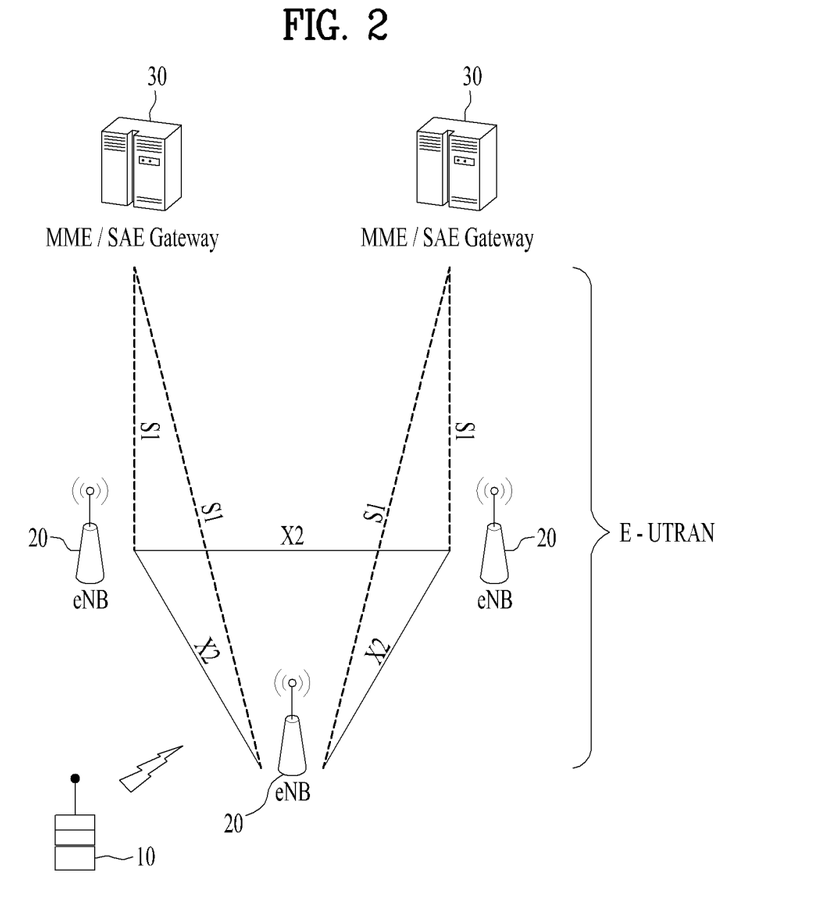
FIG. 2 is a block diagram illustrating network structure of an evolved universal mobile telecommunication system (E-UMTS).

FIG. 2 is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 3:
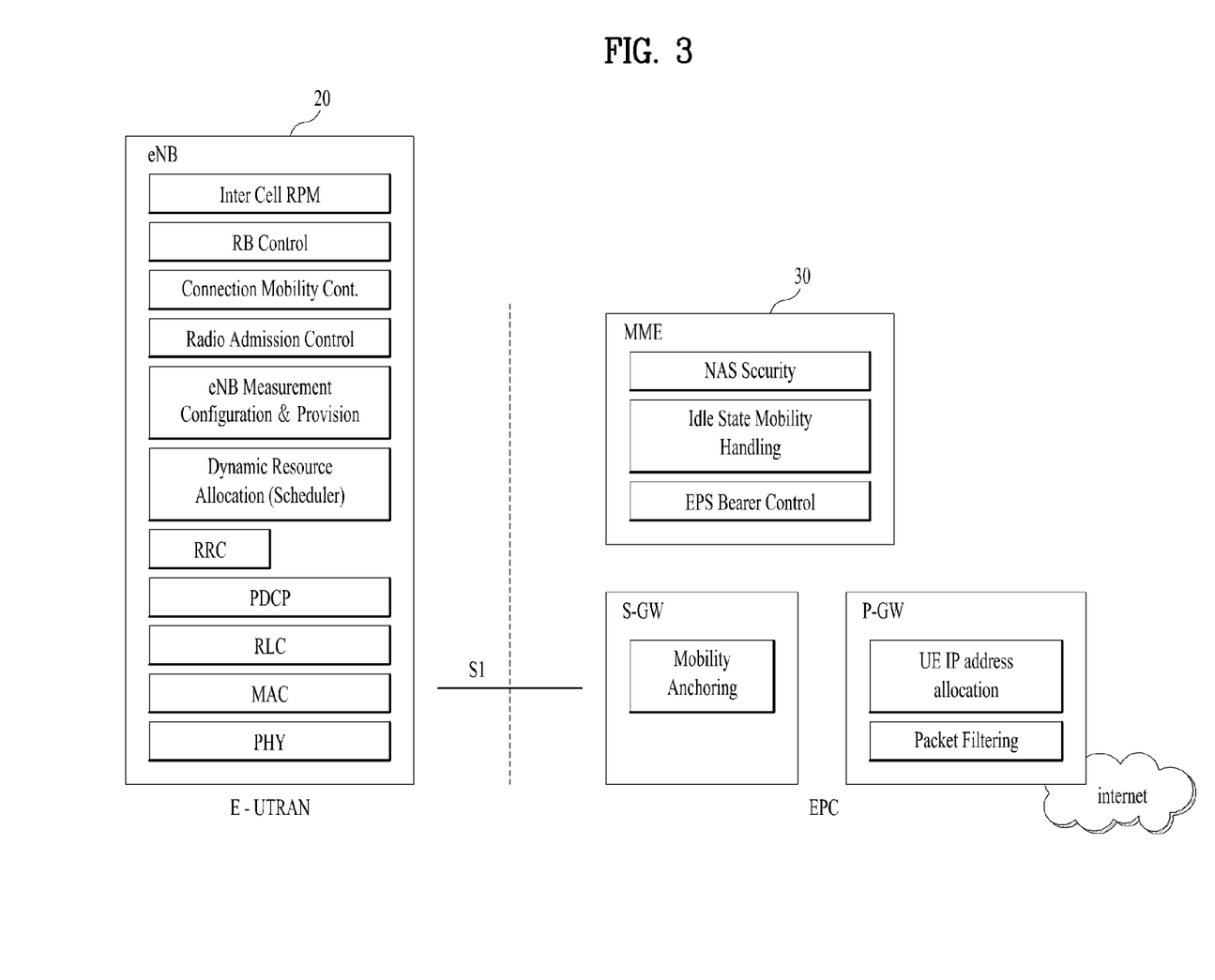
FIG. 3 is a block diagram depicting architecture of a typical E-UTRAN and a typical EPC.

FIG. 3 is a block diagram depicting architecture of a typical E-UTRAN and a typical EPC.

As illustrated in FIG. 3, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 4:
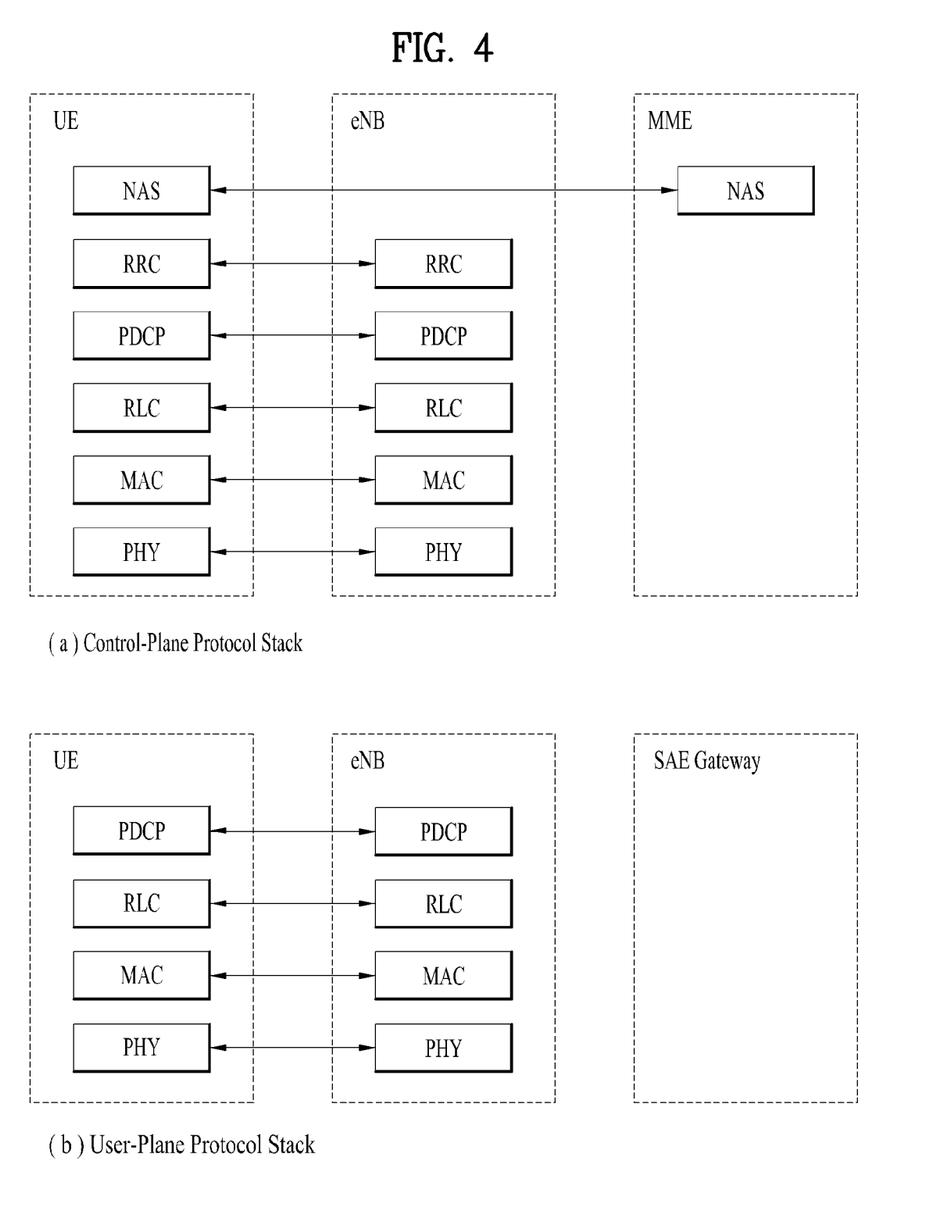
FIG. 4 is a diagram showing a control plane and a user plane of a radio interface protocol between a UE and an E-UTRAN based on a 3GPP radio access network standard.

FIG. 4 is a diagram showing a control plane and a user plane of a radio interface protocol between a UE and an E-UTRAN based on a 3GPP radio access network standard.

The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

As stated above, the present invention is related with communication in a wireless communication system supporting dual connectivity. Hereinafter, concept of dual connectivity is explained.

In LTE Rel-12, a new study on Small Cell Enhancement is started, where the dual connectivity is supported. That is, UE is connected to both Macro cell and Small cell, as shown in FIG. 5.

Figure 5:
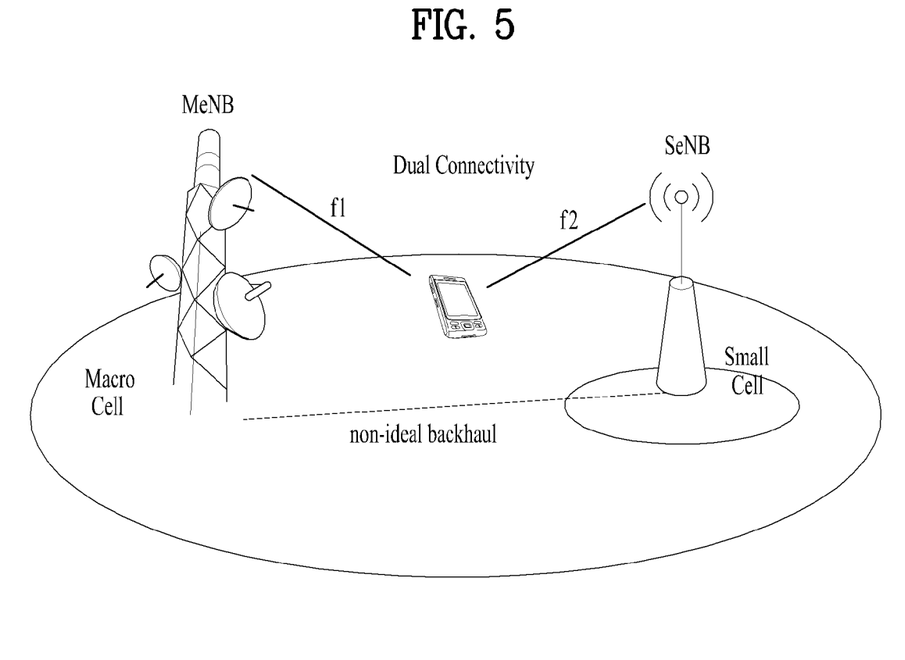
FIG. 5 is a diagram for explaining dual connectivity of the UE according to one aspect of the present invention.

FIG. 5 is a diagram for explaining dual connectivity of the UE according to one aspect of the present invention.

In FIG. 5, the MeNB stands for Macro cell eNB, and SeNB for Small cell eNB. Small cell may comprise femto cell, pico cell, etc.

The interface between MeNB and SeNB is called Xn interface. The Xn interface is assumed to be non-ideal; i.e. the delay in Xn interface could be up to 60 ms.

The SeNB is responsible for transmitting best effort (BE) type traffic, while the MeNB is responsible for transmitting other types of traffic such as VoIP, streaming data, or signaling data. Here, BE type traffic may be delay tolerable and error intolerable traffic.

Entities served by SeNB can be referred to as Small Cell Group (SCG) and those served by MeNB can be referred to as Macro Cell Group (MCG).

With dual connectivity, some of the data radio bearers (DRBs) can be offloaded to the SCG to provide high throughput while keeping scheduling radio bearers (SRBs) or other DRBs in the MCG to reduce the handover possibility. The MCG is operated by the MeNB via the frequency of f1, and the SCG is operated by the SeNB via the frequency of f2. The frequency f1 and f2 may be equal. The backhaul interface (BH) between the MeNB and the SeNB is non-ideal (e.g. X2 interface), which means that there is considerable delay in the backhaul and therefore the centralized scheduling in one node is not possible.

Figure 6A:
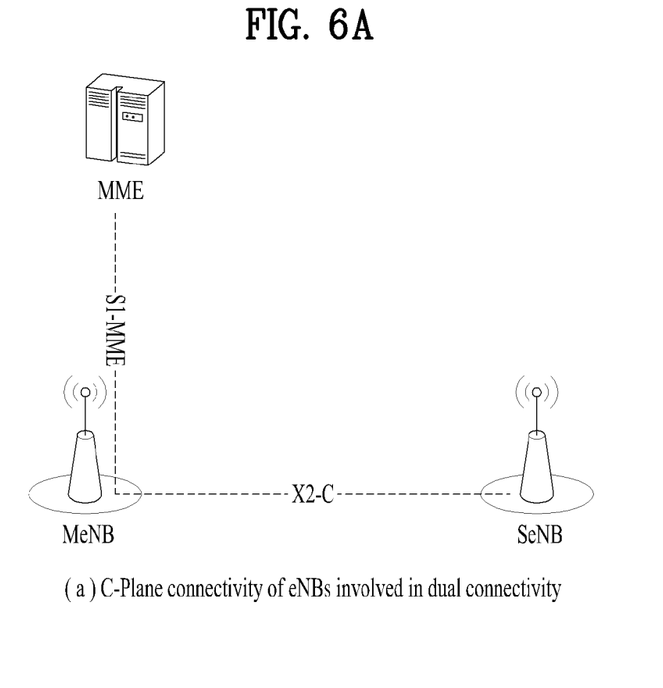
FIG. 6a is a conceptual diagram for C-Plane connectivity of base stations involved in dual connectivity.
Figure 6B:
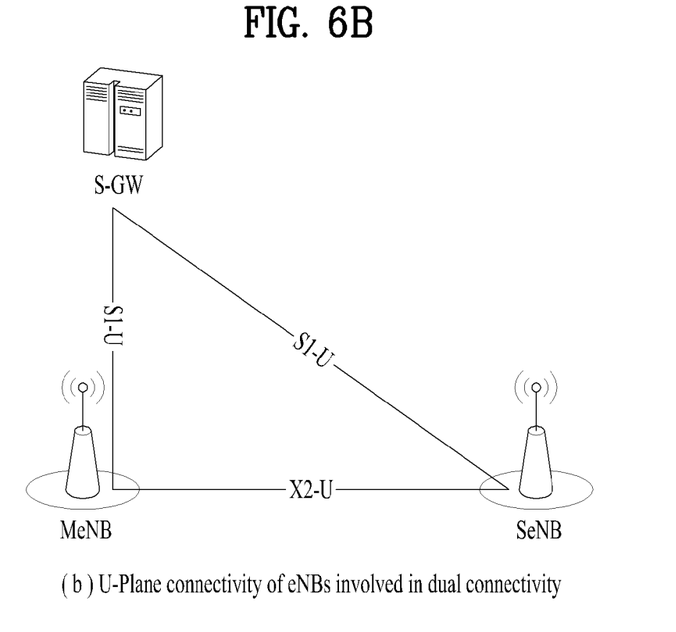
FIG. 6b is a conceptual diagram for U-Plane connectivity of base stations involved in dual connectivity.

FIG. 6a is a conceptual diagram for C-Plane connectivity of base stations involved in dual connectivity, and FIG. 6b is a conceptual diagram for U-Plane connectivity of base stations involved in dual connectivity.

FIG. 6a shows C-plane (Control Plane) connectivity of eNBs involved in dual connectivity for a certain UE. The MeNB is C-plane connected to the MME via S1-MME, the MeNB and the SeNB are interconnected via X2-C (X2-Control plane). As FIG. 6a, inter-eNB control plane signaling for dual connectivity is performed by means of X2 interface signaling. Control plane signaling towards the MME is performed by means of S1 interface signaling. There is only one S1-MME connection per UE between the MeNB and the MME. Each eNB should be able to handle UEs independently, i.e. provide the PCell to some UEs while providing SCell(s) for SCG to others. Each eNB involved in dual connectivity for a certain UE owns its radio resources and is primarily responsible for allocating radio resources of its cells, respective coordination between MeNB and SeNB is performed by means of X2 interface signaling.

FIG. 6b shows U-plane connectivity of eNBs involved in dual connectivity for a certain UE. U-plane connectivity depends on the bearer option configured: i) For MCG bearers, the MeNB is U-plane connected to the S-GW via S1-U, the SeNB is not involved in the transport of user plane data, ii) For split bearers, the MeNB is U-plane connected to the S-GW via S1-U and in addition, the MeNB and the SeNB are interconnected via X2-U, and iii) For SCG bearers, the SeNB is directly connected with the S-GW via S1-U. If only MCG and split bearers are configured, there is no S1-U termination in the SeNB. In the dual connectivity, enhancement of the small cell is required in order to data offloading from the group of macro cells to the group of small cells. Since the small cells can be deployed apart from the macro cells, multiple schedulers can be separately located in different nodes and operate independently from the UE point of view. This means that different scheduling node would encounter different radio resource environment, and hence, each scheduling node may have different scheduling results.

Figure 7:
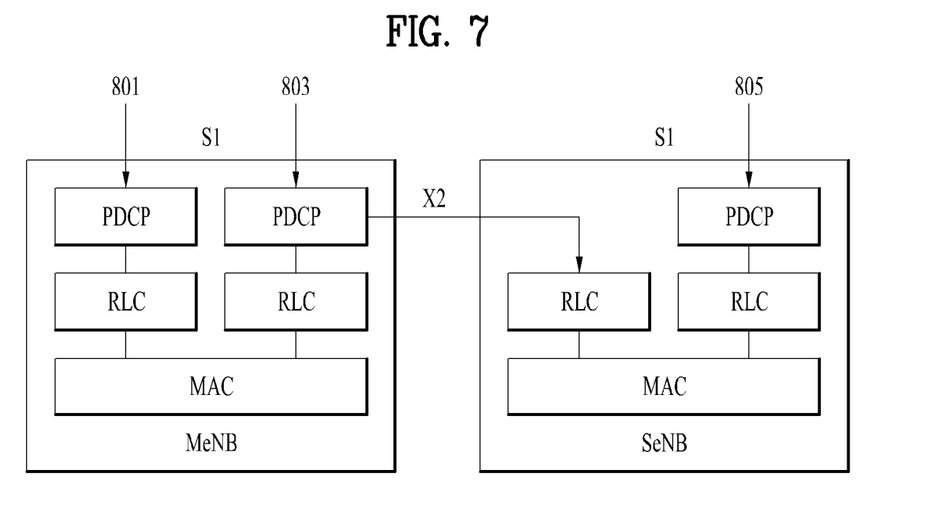
FIG. 7 is a conceptual diagram for radio protocol architecture for dual connectivity.

FIG. 7 is a conceptual diagram for radio protocol architecture for dual connectivity.

E-UTRAN of the present example can support dual connectivity operation whereby a multiple receptions/transmissions (RX/TX) UE in RRC_CONNECTED is configured to utilize radio resources provided by two distinct schedulers, located in two eNBs (or base stations) connected via a non-ideal backhaul over the X2 interface. The eNBs involved in dual connectivity for a certain UE may assume two different roles: an eNB may either act as the MeNB or as the SeNB. In dual connectivity, a UE can be connected to one MeNB and one SeNB.

In the dual connectivity operation, the radio protocol architecture that a particular bearer uses depends on how the bearer is setup. Three alternatives exist, MCG bearer (801), split bearer (803) and SCG bearer (805). Those three alternatives are depicted on FIG. 7. The SRBs (Signaling Radio Bearers) are always of the MCG bearer and therefore only use the radio resources provided by the MeNB. The MCG bearer (801) is a radio protocol only located in the MeNB to use MeNB resources only in the dual connectivity. And the SCG bearer (805) is a radio protocol only located in the SeNB to use SeNB resources in the dual connectivity.

Specially, the split bearer (803) is a radio protocol located in both the MeNB and the SeNB to use both MeNB and SeNB resources in the dual connectivity and the split bearer (803) may be a radio bearer comprising one Packet Data Convergence Protocol (PDCP) entity, two Radio Link Control (RLC) entities and two Medium Access Control (MAC) entities for one direction. Specially, the dual connectivity operation can also be described as having at least one bearer configured to use radio resources provided by the SeNB.

Figure 8:
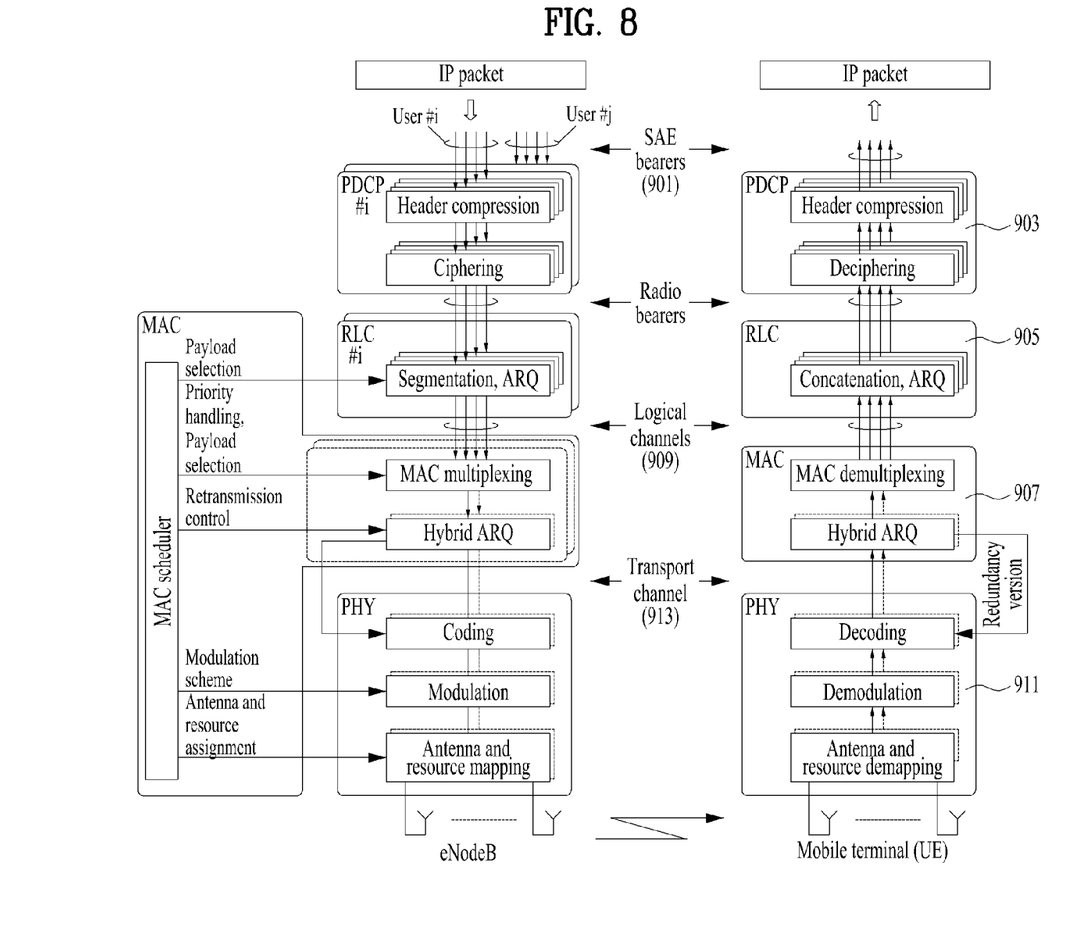
FIG. 8 is a diagram for a general overview of the LTE protocol architecture for the downlink.

FIG. 8 is a diagram for a general overview of the LTE protocol architecture for the downlink.

A general overview of the LTE protocol architecture for the downlink is illustrated in FIG. 8. Furthermore, the LTE protocol structure related to uplink transmissions is similar to the downlink structure in FIG. 8, although there are differences with respect to transport format selection and multi-antenna transmission.

Data to be transmitted in the downlink enters in the form of IP packets on one of the SAE bearers (901). Prior to transmission over the radio interface, incoming IP packets are passed through multiple protocol entities, summarized below and described in more detail in the following sections:

Packet Data Convergence Protocol (PDCP, 903) performs IP header compression to reduce the number of bits necessary to transmit over the radio interface. The header-compression mechanism is based on ROHC, a standardized header-compression algorithm used in WCDMA as well as several other mobile-communication standards. PDCP (903) is also responsible for ciphering and integrity protection of the transmitted data. At the receiver side, the PDCP protocol performs the corresponding deciphering and decompression operations. There is one PDCP entity per radio bearer configured for a mobile terminal Radio Link Control (RLC, 905) is responsible for segmentation/concatenation, retransmission handling, and in-sequence delivery to higher layers. Unlike WCDMA, the RLC protocol is located in the eNodeB since there is only a single type of node in the LTE radio-access-network architecture. The RLC (905) offers services to the PDCP (903) in the form of radio bearers. There is one RLC entity per radio bearer configured for a terminal Medium Access Control (MAC, 907) handles hybrid-ARQ retransmissions and uplink and downlink scheduling. The scheduling functionality is located in the eNodeB, which has one MAC entity per cell, for both uplink and downlink. The hybrid-ARQ protocol part is present in both the transmitting and receiving end of the MAC protocol. The MAC (907) offers services to the RLC (905) in the form of logical channels (909).

Physical Layer (PHY, 911), handles coding/decoding, modulation/demodulation, multi-antenna mapping, and other typical physical layer functions. The physical layer (911) offers services to the MAC layer (907) in the form of transport channels (913).

The MAC (907) offers services to the RLC (905) in the form of logical channels (909). A logical channels (909) are defined by the type of information it carries and generally classified into control channels, used for transmission of control and configuration information necessary for operating an LTE system, and traffic channels, used for the user data.

Figure 9:
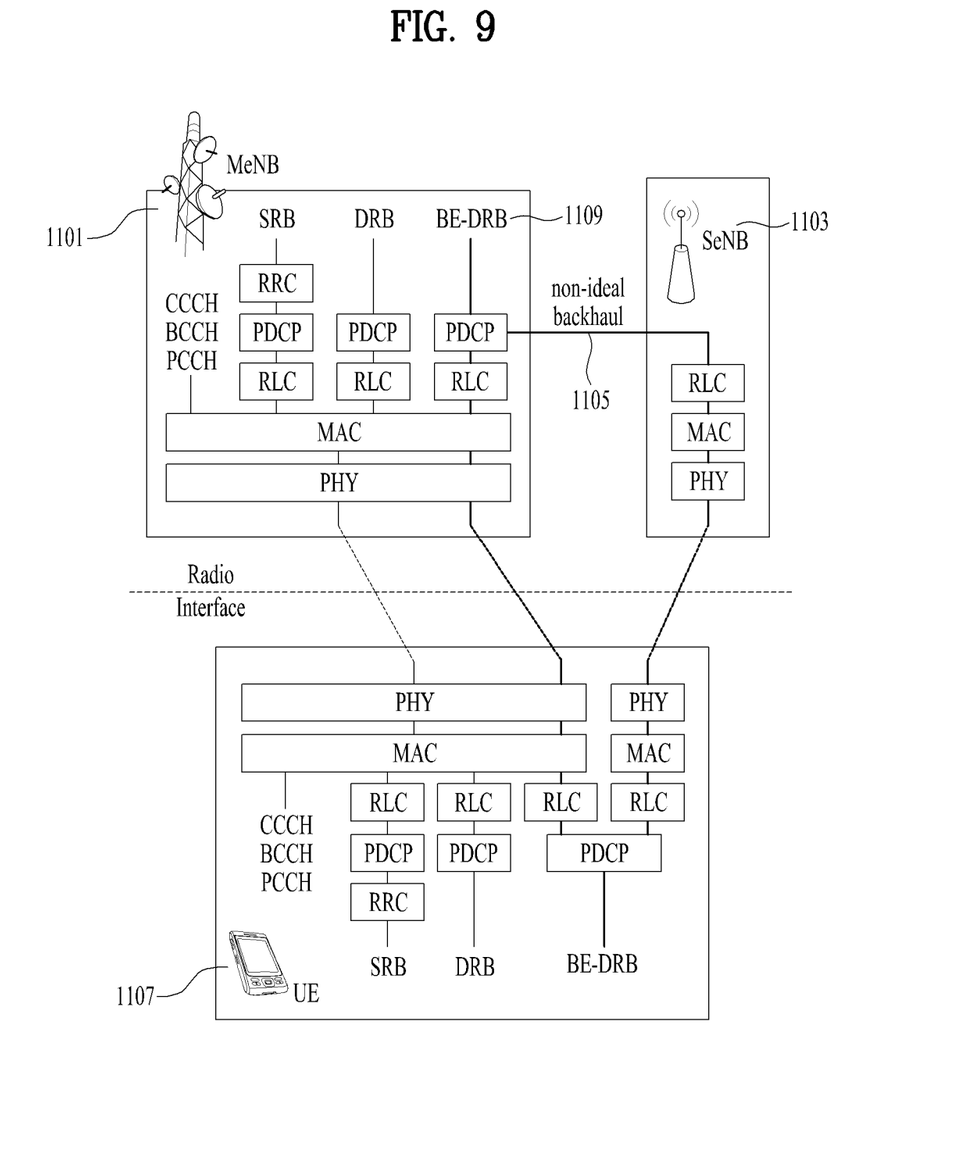
FIG. 9 shows an exemplary structure for supporting dual connectivity according to one aspect of the present invention.

FIG. 9 shows an exemplary structure for supporting dual connectivity according to one aspect of the present invention.

In FIG. 9, MeNB 1101 has various radio bearers, signaling radio bearer (SRB), data radio bearer (DRB) and best effort DRB (BE-DRB). In view of BE-DRB, PDCP is located in MeNB and two RLC entities are located in different network nodes, i.e. one in MeNB and the other in SeNB.

In the UE side, PHY, MAC and RLC entities are setup for each eNB (e.g. M-MAC for MeNB and S-MAC for SeNB). This is because the scheduling nodes are located in different nodes and two nodes are linked with non-ideal backhaul. PDCP entity is to receive data from two RLC entities.

One embodiment of the present invention is focused on this split bearer architecture where a radio bearer is split into two RLC/MAC entities, one for MeNB and the other for SeNB. Therefore, in one embodiment, it is proposed that the UE performs reordering in PDCP because downlink PDCP PDU is received from two RLC entities.

Below is for the explanation of how this new PDCP reordering function can be incorporated into the current operation.

Figure 10:
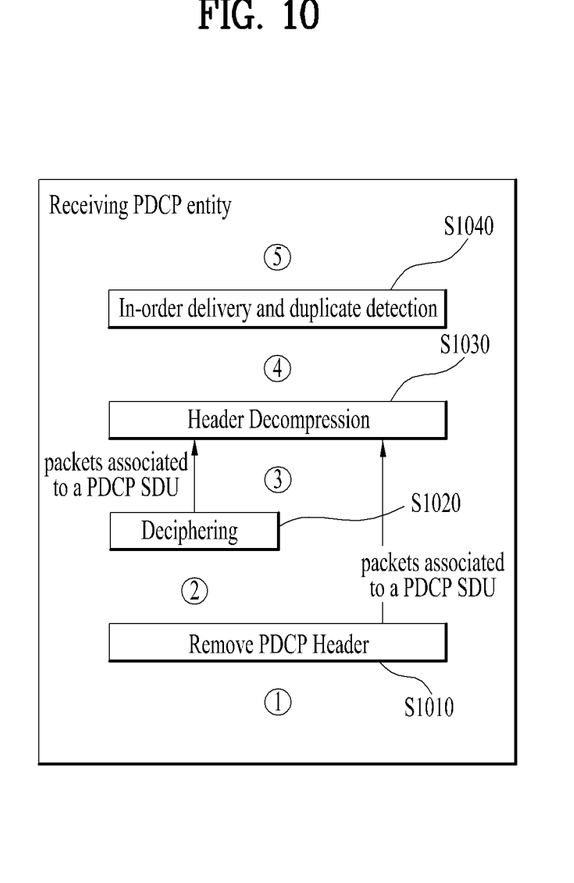
FIG. 10 is for explaining an appropriate location for PDCP reordering according to preferred embodiment of the present invention.

FIG. 10 is for explaining an appropriate location for PDCP reordering according to preferred embodiment of the present invention.

The receiving PDCP entity for user plane data can be modeled as FIG. 10. The UE of the present embodiment may receive data (PDCP PDU) from two RLC entities. This can be understood by FIG. 9. When the receiving PDCP entity of the UE receives PDCP PDU from RLC entities, it may remove PDCP header first (S1010). Packets not associated with PDCP SDU may be directly forwarded to header decompression module, while the others associated with PDCP SDU may be deciphered (S1020) and then forwarded to header decompression module (S1030). Header decompressed packet may be forwarded to In-order delivery and duplicate detection module (S1040) as shown in FIG. 10.

In FIG. 10, five potential candidate places for the above explained PDCP reordering function are as shown.

Among five options for location of PDCP reordering, inventor of the present invention observes the followings.

Options 4 and 5 are not a proper place because Header Decompression (S1030) cannot be successful if not yet received packet is the Context Update packet (e.g. IR packet).

Options 1 and 2 are practically same because PDCP Control PDUs are not affected by PDCP reordering. The 'Remove PDCP Header' block (S1010) can also be used for PDCP PDU reordering.

Option 3 is feasible. PDCP reordering is performed for deciphered PDCP PDU based on the PDCP SN or COUNT value.

So, present embodiment proposed to perform PDCP reordering of PDCP PDU received from two RLCs for supporting dual connectivity at one location among the above options 1, 2 and 3.

Among three options, it is difficult to say one is better than others. From the functional point of view, they are all feasible, and incur similar level of implication. Then, we have to take another measure to select the one of them.

Figure 11:
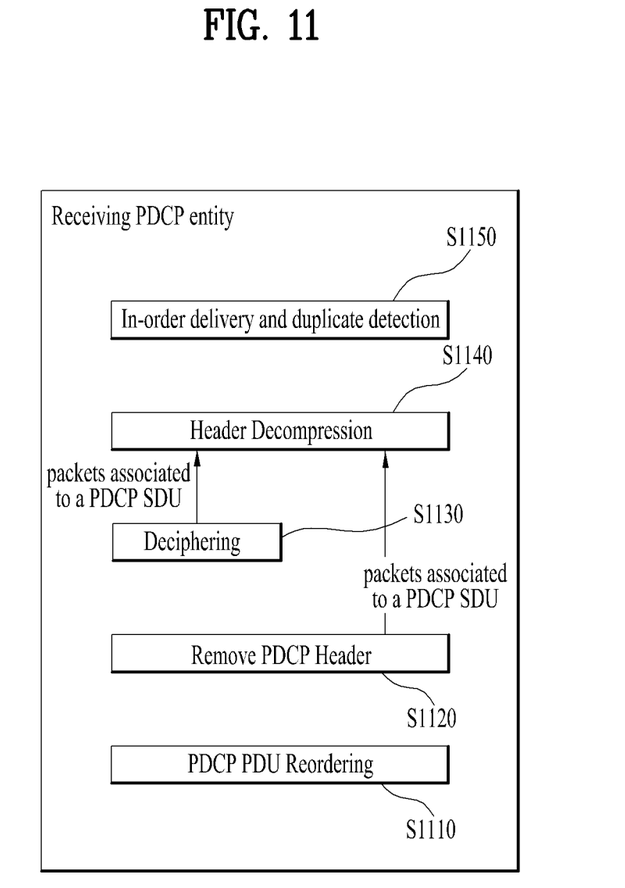
FIG. 11 shows a preferred embodiment of the present invention regarding the location of PDCP reordering for dual connectivity.

FIG. 11 shows a preferred embodiment of the present invention regarding the location of PDCP reordering for dual connectivity.

From the above observations in FIG. 10, we can narrow-down from the options 1, 2, and 3. First of all, procedures for DRBs mapped on RLC AM are shown in Table 1.

TABLE 1

For DRBs mapped on RLC AM, at reception of a PDCP Data PDU from lower layers, the UE shall:
- if received PDCP SN − Last_Submitted_PDCP_RX_SN > Reordering_Window or
  0 <= Last_Submitted_PDCP_RX_SN − received PDCP SN < Reordering_Window:
    - if received PDCP SN > Next_PDCP_RX_SN:
        - decipher the PDCP PDU as specified in the subclause 5.6, using COUNT based on RX_HFN − 1 and the received PDCP SN;
    - else:
        - decipher the PDCP PDU as specified in the subclause 5.6, using COUNT based on RX_HFN and the received PDCP SN;
    - perform header decompression (if configured) as specified in the subclause 5.5.5;
    - discard this PDCP SDU;
- else if Next_PDCP_RX_SN − received PDCP SN > Reordering_Window:
    - increment RX_HFN by one;
    - use COUNT based on RX_HFN and the received PDCP SN for deciphering the PDCP PDU;
    - set Next_PDCP_RX_SN to the received PDCP SN + 1;
- else if received PDCP SN − Next_PDCP_RX_SN >= Reordering_Window:
    - use COUNT based on RX_HFN − 1 and the received PDCP SN for deciphering the PDCP PDU;
- else if received PDCP SN >= Next_PDCP_RX_SN:
    - use COUNT based on RX_HFN and the received PDCP SN for deciphering the PDCP PDU;
    - set Next_PDCP_RX_SN to the received PDCP SN + 1;
    - if Next_PDCP_RX_SN is larger than Maximum_PDCP_SN:
        - set Next_PDCP_RX_SN to 0;
        - increment RX_HFN by one;
- else if received PDCP SN < Next_PDCP_RX_SN:
    - use COUNT based on RX_HFN and the received PDCP SN for deciphering the PDCP PDU;
- if the PDCP PDU has not been discarded in the above:
    - perform deciphering and header decompression (if configured) for the PDCP PDU as specified in the subclauses 5.6 and 5.5.5, respectively;
    - if a PDCP SDU with the same PDCP SN is stored:
        - discard this PDCP SDU;
    - else:
        - store the PDCP SDU;
    - if the PDCP PDU received by PDCP is not due to the re-establishment of lower layers:
        - deliver to upper layers in ascending order of the associated COUNT value:
            - all stored PDCP SDU(s) with an associated COUNT value less than the COUNT value associated with the received PDCP SDU;
            - all stored PDCP SDU(s) with consecutively associated COUNT value(s) starting from the COUNT value associated with the received PDCP SDU;
        - set Last_Submitted_PDCP_RX_SN to the PDCP SN of the last PDCP SDU delivered to upper layers;.
    - else if received PDCP SN = Last_Submitted_PDCP_RX_SN + 1 or received PDCP SN = Last_Submitted_PDCP_RX_SN − Maximum_PDCP_SN:
        - deliver to upper layers in ascending order of the associated COUNT value:
            - all stored PDCP SDU(s) with consecutively associated COUNT value(s) starting from the COUNT value associated with the received PDCP SDU;
        - set Last_Submitted_PDCP_RX_SN to the PDCP SN of the last PDCP SDU delivered to upper layers.

Looking through the above Table 1, one can see that DL procedure for AM DRBs is extremely complex. This is because modular operation is not used, i.e. all the state variables are compared with absolute value. Due to the absolute value comparison, there are many 'if' conditions to identify the received PDCP SN whether it is below/within/above Reordering Window and whether it causes HFN increment. In each 'if' clause, deciphering and/or header decompression is specified, sometimes with mixed procedure.

The problem with option 3 is that the PDCP reordering function should be added in-between deciphering and header decompression, which is very complex with above Table 1. Therefore, as long as the performance is similar to other options, it is proposed not to use option 3 for location of PDCP reordering.

Then, only two options are left, i.e. option 1 and option 2. As already explained above, they are practically same. However, option 1 is preferred in this embodiment as it can be seen as no impact to legacy protocols. The legacy receiving PDCP entity expects to receive PDCP PDUs from the RLC entity in the increasing order of PDCP SN, and the PDCP reordering function in the beginning of receiving PDCP entity can do this job even if the PDCP entity receives PDCP PDUs from the two RLC entities. This proposal for new PDCP reordering is shown in FIG. 11.

According to FIG. 11, the receiving PDCP entity of the UE performs reordering the PDCP PDU (S1110), when it receives PDCP PDU from two RLC as explained with regards to FIG. 9. That is, deciphering PDCP PDU (S1130) is performed after reordering PDCP PDU (S1120). Removing PDCP header (S1120) is also performed after PDCP PDU reordering (S1110), but is can be viewed as not a mandatory operation.

PDCP reordering may include storing the PDCP PDU received from the two RLC entities in a reordering buffer. Header decompression (S1140) is performed on the deciphered PDCP PDU. Then, these PDUs are delivered to upper layer in sequence (S1150) without duplication.

In another aspect of the present invention, to realize the above explained PDCP reordering function, state variables and timers are introduced. In current PDCP specification, some state variables are already defined to support 'in-order delivery and duplicate detection' function.

The PDCP reordering function can utilize already defined state variables as shown below.

The transmitting side of each PDCP entity shall maintain the following state variables:

a) Next_PDCP_TX_SN

The variable Next_PDCP_TX_SN indicates the PDCP SN of the next PDCP SDU for a given PDCP entity. At establishment of the PDCP entity, the UE shall set Next_PDCP_TX_SN to 0.

b) TX_HFN

The variable TX_HFN indicates the HFN value for the generation of the COUNT value used for PDCP PDUs for a given PDCP entity. At establishment of the PDCP entity, the UE shall set TX_HFN to 0.

The receiving side of each PDCP entity shall maintain the following state variables:

c) Next_PDCP_RX_SN

The variable Next_PDCP_RX_SN indicates the next expected PDCP SN by the receiver for a given PDCP entity. At establishment of the PDCP entity, the UE shall set Next_PDCP_RX_SN to 0.

d) RX_HFN

The variable RX_HFN indicates the HFN value for the generation of the COUNT value used for the received PDCP PDUs for a given PDCP entity. At establishment of the PDCP entity, the UE shall set RX_HFN to 0.

e) Last_Submitted_PDCP_RX_SN

For PDCP entities for DRBs mapped on RLC AM the variable Last_Submitted_PDCP_RX_SN indicates the SN of the last PDCP SDU delivered to the upper layers. At establishment of the PDCP entity, the UE shall set Last_Submitted_PDCP_RX_SN to Maximum PDCP SN.

However, it may cause impacting legacy protocol behaviors, so it is proposed to introduce new state variables specific to the above PDCP reordering function. The timer anyway needs to be introduced for PDCP reordering as the only timer used in legacy protocol is discardTimer.

The transmitting side of each PDCP entity for DRBs shall maintain the following timers:

a) discardTimer

The duration of the timer is configured by upper layers. In the transmitter, a new timer is started upon reception of an SDU from upper layer.

So, it is proposed to incorporate timer for PDCP reordering operation other than the above discardTimer.

Also, it is proposed that the PDCP reordering function is configurable per radio bearer. Since the split bearer is a kind of configuration from the bearer served by the MeNB, this function should also be configurable depending on whether the radio bearer is served by both MeNB and SeNB, or only by MeNB.

Figure 12:
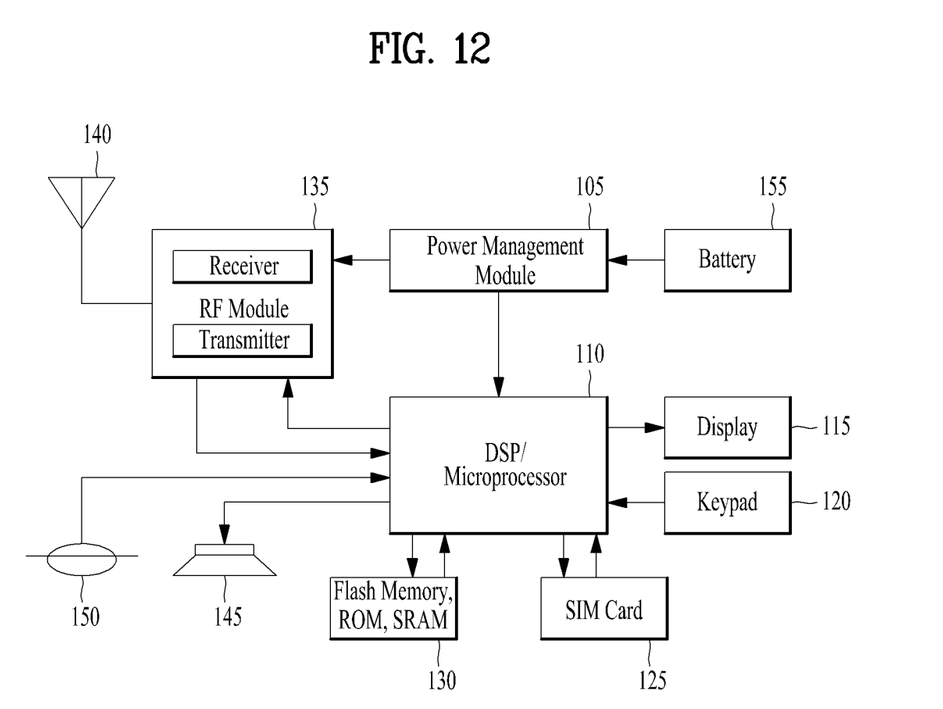
FIG. 12 is a block diagram of a communication apparatus according to an embodiment of the present invention.

FIG. 12 is a block diagram of a communication apparatus according to an embodiment of the present invention.

The apparatus shown in FIG. 12 can be a user equipment (UE) adapted to perform the above data reception in dual connectivity situation, but it can be any apparatus for performing the same operation.

As shown in FIG. 12, the apparatus may comprises a DSP/microprocessor (110) and RF module (transmiceiver; 135). The DSP/microprocessor (110) is electrically connected with the transciver (135) and controls it. The apparatus may further include power management module (105), battery (155), display (115), keypad (120), SIM card (125), memory device (130), speaker (145) and input device (150), based on its implementation and designer's choice.

Specifically, the microprocessor or processor (110) is adapted to control the transceiver (135) to perform that the above explained PDCP reordering.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A receiving side device for receiving data in a wireless communication system, the receiving device comprising:
  one or more Radio Link Control (RLC) entities; and
  a Packet Data Convergence Protocol (PDCP) entity including:
    a receiving unit configured to receive at least one PDCP data unit from the one or more RLC entities,
    a deciphering unit configured to decipher the at least one PDCP data unit, and
    an in order delivery and duplicate detection unit configured to perform in order delivery and duplicate detection for the deciphered at least one PDCP data unit, wherein, in a case that the PDCP entity is associated with two RLC entities, the PDCP entity further includes a reordering unit configured to perform reordering PDCP data units received from the two RLC entities after performing deciphering the PDCP data units by the deciphering unit.

2. The receiving side device of claim 1, wherein one of the two RLC entities is for a Master E-UTRAN NodeB (MeNB) and the other of the two RLC entities is for a Secondary E-UTRAN NodeB (SeNB).

3. The receiving side device of claim 1, wherein the reordering unit is configured to perform reordering PDCP data units received from the two RLC entities right after performing deciphering the at least one PDCP data unit by the deciphering unit.

4. The receiving side device of claim 2, further comprising:
a reordering buffer configured to store the PDCP data units received from the two RLC entities.

5. The receiving device of claim 1, further comprising:
a header removing unit configured to remove at least one header of the at least one PDCP data unit.

6. The receiving device of claim 1, wherein the reordering unit is configured to reorder the PDCP data units by using a state variable specifically defined for the reordering.

7. The receiving device of claim 1, wherein the reordering unit is configured to reorder PDCP data units by using a timer specifically defined for the reordering.

8. The receiving device of claim 1, wherein the reordering unit is configured to reorder PDCP data units per radio bearer.

* * * * *